(12) United States Patent
Nishikai et al.

(10) Patent No.: US 11,635,923 B2
(45) Date of Patent: Apr. 25, 2023

(54) MONITORING SYSTEM, MONITORING METHOD, AND MONITORING PROGRAM

(71) Applicant: KYOCERA Document Solutions Inc., Osaka (JP)

(72) Inventors: Kazuki Nishikai, Osaka (JP); Koki Nakajima, Osaka (JP); Takeshi Nakamura, Osaka (JP); Satoshi Goshima, Osaka (JP); Yasuo Nakashima, Osaka (JP); Dukil Park, Osaka (JP); Yuichi Obayashi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 16 days.

(21) Appl. No.: 17/417,475

(22) PCT Filed: Dec. 25, 2019

(86) PCT No.: PCT/JP2019/050841
§ 371 (c)(1),
(2) Date: Jun. 23, 2021

(87) PCT Pub. No.: WO2020/138176
PCT Pub. Date: Jul. 2, 2020

(65) Prior Publication Data
US 2022/0066704 A1    Mar. 3, 2022

(30) Foreign Application Priority Data

Dec. 28, 2018 (JP) .............................. JP2018-246635
Dec. 28, 2018 (JP) .............................. JP2018-246644
Dec. 28, 2018 (JP) .............................. JP2018-246646

(51) Int. Cl.
*G06F 3/12* (2006.01)

(52) U.S. Cl.
CPC ............ *G06F 3/121* (2013.01); *G06F 3/1234* (2013.01); *G06F 3/1285* (2013.01)

(58) Field of Classification Search
CPC combination set(s) only.
See application file for complete search history.

(56) References Cited

U.S. PATENT DOCUMENTS

2010/0318856 A1* 12/2010 Yoshida .............. G06F 11/3006
707/723
2011/0066908 A1* 3/2011 Bartz .................. H04L 41/0631
714/E11.01

(Continued)

FOREIGN PATENT DOCUMENTS

| JP | H07-162420 | 6/1995 |
| JP | H08-030152 | 2/1996 |

(Continued)

*Primary Examiner* — Helen Zong
(74) *Attorney, Agent, or Firm* — Lex IP Meister, PLLC

(57) ABSTRACT

Provided are a monitoring system, a monitoring method, and a non-transitory computer-readable storage medium storing a monitoring program whereby it is possible to improve the stability of remote management of an image forming device by means of a remote management system. A monitoring system according to one embodiment is characterized by: acquiring information from a remote management system which remotely manages an image forming device; detecting a failure of the remote management system by analyzing the acquired information; and notifying about the failure of the remote management system which has been detected.

15 Claims, 15 Drawing Sheets

(56) References Cited

U.S. PATENT DOCUMENTS

| | | | |
|---|---|---|---|
| 2019/0054700 A1* | 2/2019 | Chandar | G06F 17/18 |
| 2019/0205069 A1* | 7/2019 | Hakamata | G06F 3/126 |
| 2019/0258432 A1* | 8/2019 | Iwasaki | G06F 3/0482 |
| 2019/0265929 A1* | 8/2019 | Kitagata | G06F 3/1236 |

FOREIGN PATENT DOCUMENTS

| | | |
|---|---|---|
| JP | 2006-099249 | 4/2006 |
| JP | 2012-088855 | 5/2012 |
| JP | 2013-073389 | 4/2013 |
| JP | 2013-250915 | 12/2013 |
| JP | 2017-027124 | 2/2017 |
| JP | 6303875 | 4/2018 |
| JP | 6331778 | 5/2018 |
| JP | 2018-136656 | 8/2018 |
| WO | 2016/121728 | 8/2016 |

* cited by examiner

FIG. 6

54c CLOUD FAILURE TABLE

| DETAILS (ORIGINAL TEXT) | PLACE | REGION OF OCCURRENCE | FAILURE CODE | START DATE AND TIME | END DATE AND TIME | ... |
|---|---|---|---|---|---|---|
| ... | ... | ... | ... | ... | ... | ... |
| FAILURE HAS OCCURRED IN SERVICE A. | NW | US | 001 | 2018/09/22 14:00 | 2018/09/22 16:00 | ... |
| ... | ... | ... | ... | ... | ... | ... |

FIG. 7

54d TEMPORARY MANAGEMENT TABLE

| DETAILS (ORIGINAL TEXT) | PLACE | REGION OF OCCURRENCE | SIGNIFICANCE LEVEL | PLACE OF CAUSE | DETECTION DATE AND TIME | DEGREE OF SIMILARITY | ... |
|---|---|---|---|---|---|---|---|
| ... | ... | ... | ... | ... | ... | ... | ... |
| Error task failure | ServiceA | US | | | 2018/09/22 15:00 | | ... |
| ... | ... | ... | ... | ... | ... | ... | ... |

FIG. 8

54e FAILURE HISTORY TABLE

| DETAILS (ORIGINAL TEXT) | PLACE | REGION OF OCCURRENCE | SIGNIFICANCE LEVEL | PLACE OF CAUSE | DETECTION DATE AND TIME | DEGREE OF SIMILARITY | · · · |
|---|---|---|---|---|---|---|---|
| · · · | · · · | · · · | · · · | · · · | · · · | · · · | · · · |
| Error task failure | ServiceA | US | 50 | EXTERNAL | 2018/09/22 15:00 | 60 | × × × |
| · · · | · · · | · · · | · · · | · · · | · · · | · · · | · · · |

FIG. 9

54f NOTIFICATION DESTINATION DETERMINATION TABLE

| PLACE | REGION OF OCCURRENCE | SIGNIFICANCE LEVEL | PLACE OF CAUSE | DEGREE OF SIMILARITY | . . . | NOTIFICATION DESTINATION | NOTIFICATION CONTENTS |
|---|---|---|---|---|---|---|---|
| . . . | . . . | . . . | . . . | . . . | . . . | . . . | . . . |
| ServiceA | US | 50 OR MORE BUT LESS THAN 60 | — | 60 | . . . | ex@hoge.com | FAILURE HAS OCCURRED. |
| . . . | . . . | . . . | . . . | . . . | . . . | . . . | . . . |

MONITORING SYSTEM, MONITORING METHOD, AND MONITORING PROGRAM

TECHNICAL FIELD

The present invention relates to a monitoring system, a monitoring method, and a non-transitory computer-readable storage medium storing a monitoring program for a remote management system which remotely manages an image forming device.

BACKGROUND ART

Conventionally, remote management systems which detect failures of image forming devices are known (refer to, for example Patent Literatures 1 to 4).

CITATION LIST

Patent Literature

PTL 1: JPH08-30152 A
PTL 2: JP 6303875 B
PTL 3: JP 6331778 B
PTL 4: JP 2017-27124 A

SUMMARY OF THE INVENTION

Problems to be Solved by the Invention

However, with the conventional technology, since a failure of a remote management system cannot be detected, when a failure occurs in the remote management system, there is a problem that an image forming device cannot be remotely managed by the remote management system.

Therefore, an object of the present invention is to provide a monitoring system, a monitoring method, and a non-transitory computer-readable storage medium storing a monitoring program, whereby it is possible to improve the stability of remote management of an image forming device by means of a remote management system.

Means for Solving the Problem

A monitoring system of the present invention includes: an information acquiring unit which acquires information from a remote management system, which remotely manages an image forming device; an information analyzing unit which analyzes the information acquired by the information acquiring unit; and a result notifying unit which notifies about a result of analysis by the information analyzing unit, and is characterized in that the information analyzing unit detects a failure of the remote management system on the basis of the information acquired by the information acquiring unit, and the result notifying unit notifies about the failure of the remote management system detected by the information analyzing unit.

By the above configuration, when a failure occurs in the remote management system, since the monitoring system of the present invention notifies about the failure of the remote management system, an appropriate action can be taken for the remote management system. Accordingly, the monitoring system of the present invention can improve the stability of remote management of the image forming device by means of the remote management system.

In the monitoring system of the present invention, the information acquiring unit may acquire information also from at least one of the image forming device and an ICT infrastructure on which the remote management system operates.

By the above configuration, the monitoring system of the present invention detects a failure of the remote management system on the basis of not only the information acquired from the remote management system, but also the information acquired from at least one of the image forming device and the ICT infrastructure on which the remote management system operates. Consequently, accuracy of detecting the failure of the remote management system can be improved.

In the monitoring system of the present invention, the information analyzing unit may analyze the information by allocating the information according to at least one of criteria including: time series; a significance level of the failure indicated by the information; a degree of similarity of the failure indicated by the information as compared to failures that have occurred in the past; and whether a failure occurs simultaneously in a constituent element different from a constituent element from which the information has been acquired.

By the above configuration, the monitoring system of the present invention analyzes the information by allocating the information according to at least one of the criteria including: the time series; the significance level of the failure indicated by the information; the degree of similarity of the failure indicated by the information as compared to failures that have occurred in the past; and whether a failure occurs simultaneously in a constituent element different from a constituent element from which the information has been acquired. Consequently, it is possible to detect a failure of the remote management system, which is difficult to be noticed by human monitoring, on the basis of an enormous amount of information acquired from the remote management system and the like.

In the monitoring system of the present invention, when a failure of the remote management system that has been analyzed by the information analyzing unit satisfies a preset condition, the result notifying unit may notify about the failure to a notification destination set correspondingly to the condition.

By the above configuration, when a detected failure satisfies a preset condition, the monitoring system of the present invention notifies about the failure to the notification destination set correspondingly to the condition. Consequently, the failure can be notified to an appropriate person corresponding to the failure.

A monitoring method of the present invention which employs a computer and a storage unit includes: information acquiring of acquiring information from a remote management system, which remotely manages an image forming device; information analyzing of analyzing the information acquired in the information acquiring; and result notifying of notifying about a result of analysis of the information analyzing, where the information analyzing includes detecting a failure of the remote management system based on the information acquired in the information acquiring, and the result notifying includes notifying about the failure of the remote management system detected in the information analyzing.

By the above configuration, when a failure occurs in the remote management system, since the monitoring method of the present invention notifies about the failure of the remote management system, an appropriate action can be taken for the remote management system. Accordingly, the monitoring method of the present invention can improve the stability of remote management of the image forming device by means of the remote management system.

A non-transitory computer-readable storage medium storing a monitoring program of the present invention causes a computer to implement: an information acquiring unit which acquires information from a remote management system, which remotely manages an image forming device; an information analyzing unit which analyzes the information acquired by the information acquiring unit; and a result notifying unit which notifies about a result of analysis by the information analyzing unit, and is characterized in that the information analyzing unit detects a failure of the remote management system on the basis of the information acquired by the information acquiring unit, and the result notifying unit notifies about the failure of the remote management system detected by the information analyzing unit.

By the above configuration, when a failure occurs in the remote management system, since the computer which executes the monitoring program of the present invention notifies about the failure of the remote management system, an appropriate action can be taken for the remote management system. Accordingly, the computer which executes the monitoring program of the present invention can improve the stability of remote management of the image forming device by means of the remote management system.

Effect of the Invention

The monitoring system, the monitoring method, and the non-transitory computer-readable storage medium storing the monitoring program of the present invention can improve the stability of remote management of an image forming device by means of a remote management system.

BRIEF DESCRIPTION OF THE DRAWINGS

FIG. 6 is a drawing showing an example of a cloud failure table shown in FIG. 5.

FIG. 7 is a drawing showing an example of a temporary management table shown in FIG. 5.

FIG. 8 is a drawing showing an example of a failure history table shown in FIG. 5.

FIG. 9 is a drawing showing an example of a notification destination determination table shown in FIG. 5.

MODE FOR CARRYING OUT THE INVENTION

In the following, embodiments of the present invention will be described with reference to the drawings.

First, a configuration of a system according to an embodiment of the present invention will be described.

Figure 1:
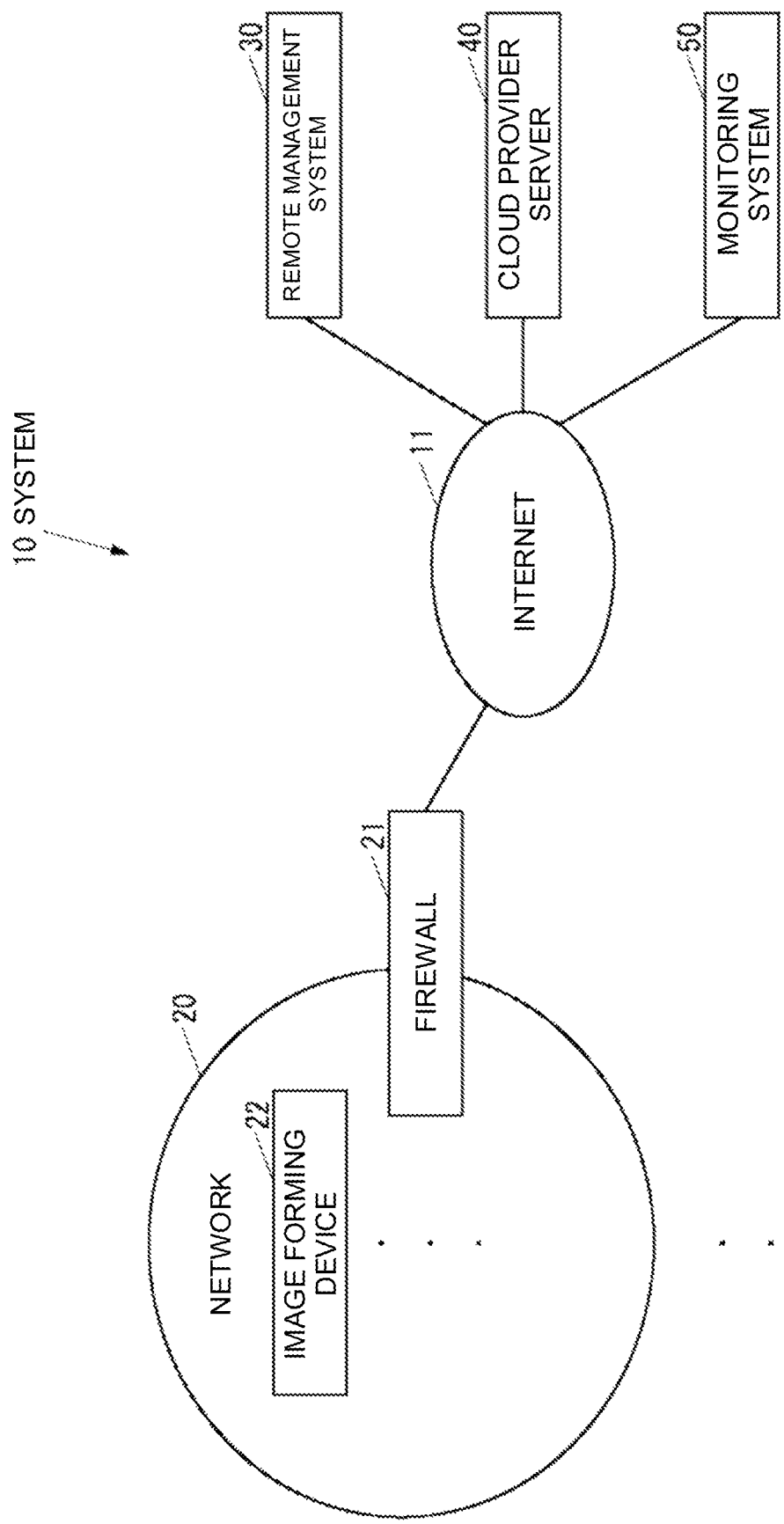
FIG. 1 is a block diagram of a system according to one embodiment of the present invention.

FIG. 1 is a block diagram of a system 10 according to the present embodiment.

As illustrated in FIG. 1, the system 10 is provided with a network 20, such as a LAN (Local Area Network), of a customer of a vendor (hereinafter referred to as a "management vendor") who manages an image forming device. The system 10 may include, other than the network 20, at least one network having the same configuration as that of the network 20.

The network 20 is provided with a firewall 21 which controls communication between the interior of the network 20 and the exterior of the network 20, and an image forming device 22. The network 20 may include, other than the image forming device 22, at least one image forming device having the same configuration as that of the image forming device 22. The image forming device in the network 20 is composed of, for example, an MFP (Multifunction Peripheral), a printer dedicated machine, and the like, and is used by the customer of the management vendor.

The system 10 is provided with a remote management system 30 which remotely manages each of the image forming devices of the system 10. The remote management system 30 is used by the management vendor. The remote management system 30 may be configured by a single computer or by a plurality of computers. In the following, explanation is given assuming that the remote management system 30 operates on a cloud platform of a public cloud as an ICT (Information and Communication Technology) infrastructure.

Since a large number of image forming devices can be connected to the remote management system 30 via the Internet, the capability of a server which constitutes the remote management system 30 is expanded with flexibility as the number of image forming devices connected to the remote management system 30 increases. Also, as regards the cloud platform on which the remote management system 30 operates, a part of the system may go down at a timing the remote management system 30 is not aware of due to a system failure or maintenance of the cloud platform. Therefore, for stable operation of the remote management system 30 itself, since the remote management system 30 needs to receive an appropriate action in a case where a failure occurs in constitute elements of the remote management system 30 itself, the constitute elements of the remote management system 30 itself need to be monitored.

The system 10 is provided with a cloud provider server 40, which is an endpoint provided by a provider of the cloud platform on which the remote management system 30 operates.

The system 10 is provided with a monitoring system 50 which monitors the remote management system 30. The monitoring system 50 is used by the management vendor. The monitoring system 50 may be configured by a single computer or by a plurality of computers.

Each network, the remote management system 30, the cloud provider server 40, and the monitoring system 50 of the system 10 can communicate with each other via the Internet 11.

Figure 2:
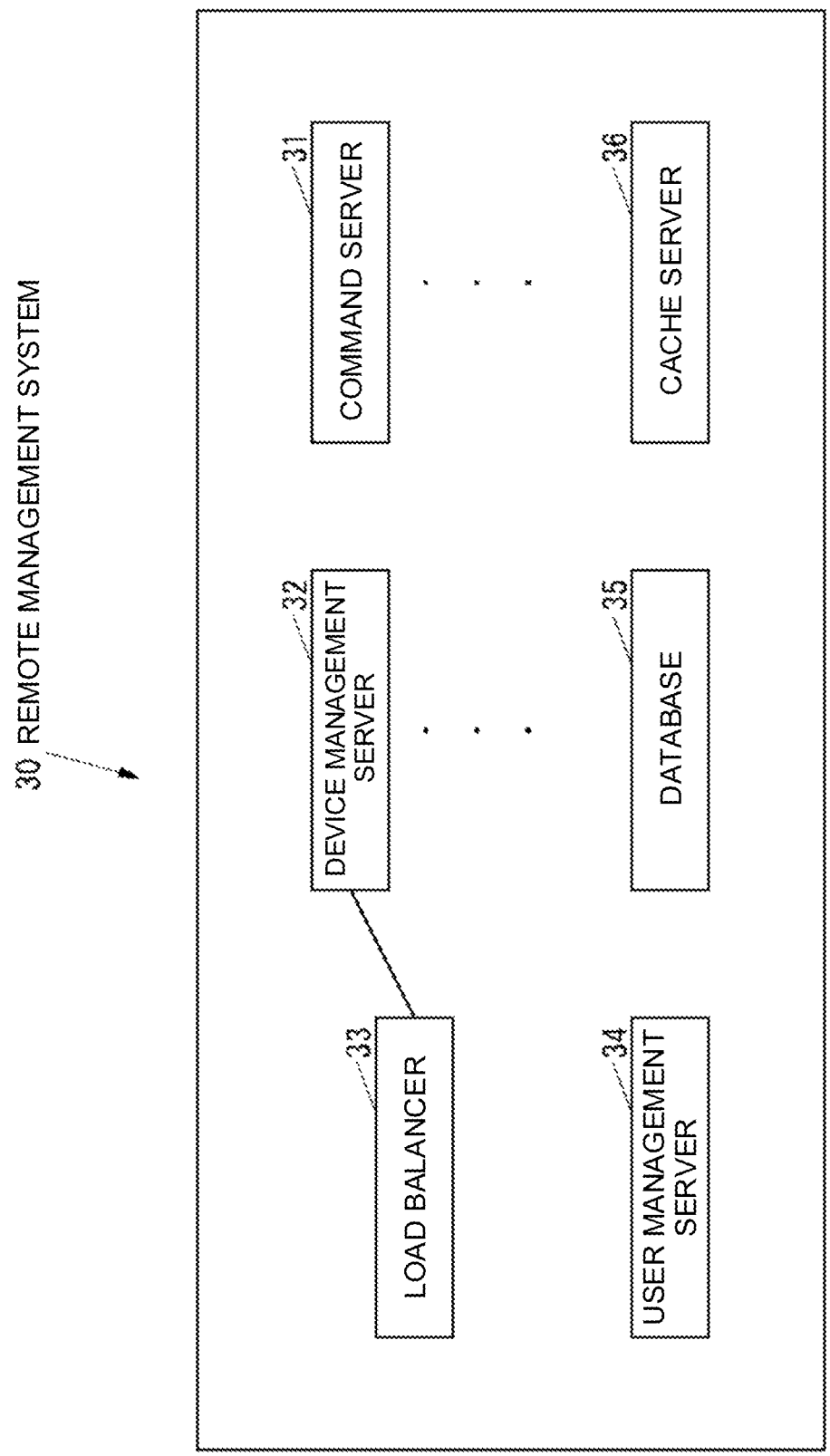
FIG. 2 is a block diagram of a remote management system shown in FIG. 1.

FIG. 2 is a block diagram of the remote management system 30.

As illustrated in FIG. 2, the remote management system 30 is provided with a command server 31 which issues a control command to the image forming device. The remote management system 30 may include, other than the command server 31, at least one command server having the same configuration as that of the command server 31. When a connection with the image forming device is established, the command server can issue a control command which goes beyond the firewall to this image forming device. One command server can be connected to, for example, 4,000 image forming devices simultaneously.

The remote management system 30 is provided with a device management server 32, which processes information that has been sent from an image forming device having made an attempt to make a connection beyond the firewall, and is necessary for management of this image forming device, and instructs the aforementioned image forming device to establish a connection with an appropriate command server. Here, the appropriate command server refers to, for example, a command server having the least number of image forming devices that have established the connection. The remote management system 30 may include, other than the device management server 32, at least one device management server having the same configuration as that of the device management server 32. One device management server can execute, for example, processing for 2,000 image forming devices per minute.

The remote management system 30 is provided with a load balancer 33 which distributes a load by assigning, to an appropriate device management server, the information that has been sent from an image forming device having made an attempt to make a connection beyond the firewall, and is necessary for management of this image forming device.

The remote management system 30 is provided with a user management server 34 which receives an operation for performing various remote operations of the image forming device, such as acquiring various kinds of information from the image forming device, updating control software of the image forming device, and making various settings of the image forming device, from a user such as a service person of the management vendor. The command server performs maintenance of the image forming device by transferring, to the image forming device, the operation received by the user management server 34 as the control command.

The remote management system 30 is provided with a database 35 and a cache server 36 which store various kinds of information collected from the image forming device by the command server, such as information on a print counter of the image forming device and authentication of the image forming device.

Figure 3:
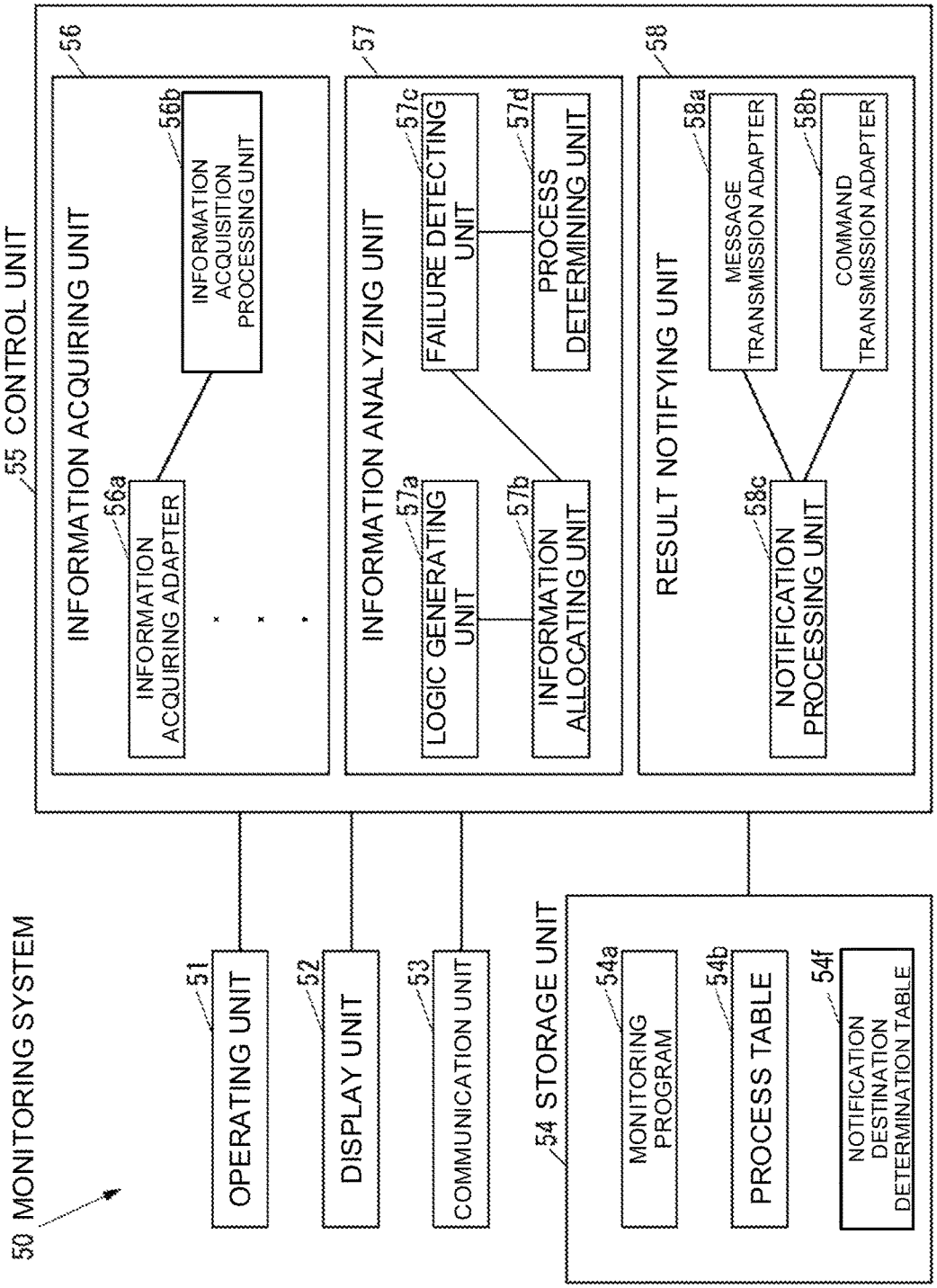
FIG. 3 is a block diagram of a monitoring system shown in FIG. 1 in a case where it is configured by a single computer.

FIG. 3 is a block diagram of the monitoring system 50 in a case where it is configured by a single computer.

The monitoring system 50 illustrated in FIG. 3 includes an operating unit 51 which is as an operation device, such as a keyboard and a mouse that allows input of various operations, a display unit 52 which is a display device, such as an LCD (Liquid Crystal Display) that displays various kinds of information, a communication unit 53 which is a communication device that communicates with an external device over a network such as a LAN and the Internet, or not over a network but directly in a wired or wireless manner, a storage unit 54 which is a non-volatile storage device, such as a semiconductor memory and an HDD (Hard Disk Drive) that store various kinds of information, and a control unit 55 that controls the entire monitoring system 50.

The storage unit 54 stores a monitoring program 54a for monitoring the remote management system 30 (see FIG. 2). The monitoring program 54a may be installed on the monitoring system 50 at the manufacturing stage of the monitoring system 50, or may additionally be installed on the monitoring system 50 from an external storage medium such as a CD (Compact Disk), a DVD (Digital Versatile Disk), and a USB (Universal Serial Bus) memory, or may additionally be installed on the monitoring system 50 over a network.

The storage unit 54 stores a process table 54b which indicates a process corresponding to a failure. The control unit 55 can update the process table 54b in response to an instruction given via the operating unit 51 or the communication unit 53.

The storage unit 54 can store a notification destination determination table 54f for determining a destination of notifying about occurrence of a failure. The notification destination determination table 54f corresponds to information in which the condition for notifying about the occurrence of a failure and the destination of notifying about the occurrence of the failure are associated with each other. The control unit 55 can update the notification destination determination table 54f in response to an instruction given via the operating unit 51 or the communication unit 53.

The control unit 55 includes, for example, a CPU (Central Processing Unit), a ROM (Read Only Memory) which stores a program and various kinds of data, and a RAM (Random Access Memory) as a memory for use as a work area of the CPU of the control unit 55. The CPU of the control unit 55 executes the program stored in the storage unit 54 or the ROM of the control unit 55.

As the control unit 55 executes the monitoring program 54a, the control unit 55 implements an information acquiring unit 56 which acquires information from a constituent element of the system 10, an information analyzing unit 57 which analyzes the information acquired by the information acquiring unit 56, and a result notifying unit 58 which notifies about a result of analysis by the information analyzing unit 57.

The information acquiring unit 56 includes an information acquiring adapter 56a which is a module for acquiring information from a constituent element of the system 10. Here, the constituent element of the system 10 includes the image forming device of the system 10, constituent elements of the remote management system 30, and the cloud provider server 40. Further, the constituent elements of the remote management system 30 include the command server, the device management server, the user management server 34, the database 35, and the cache server 36. The information acquiring unit 56 may include, other than the information acquiring adapter 56a, at least one information acquiring adapter having the same configuration as that of the information acquiring adapter 56a. The information acquired from the image forming device by the information acquiring adapter is, for example, information on whether or not the image forming device is stopped, and information on an error that has occurred in the image forming device. The information acquired from a constituent element of the remote management system 30 by the information acquiring adapter is, for example, information on whether or not the constituent element is stopped, and information on an error that has occurred in the constituent element. The information acquired from the cloud provider server 40 by the information acquiring adapter is, for example, information related to maintenance of the cloud platform on which the remote management system 30 operates, i.e., information on whether the cloud platform is operating normally.

In at least one constituent element of the system 10 such as the image forming device of the system 10, the command server, the device management server, the user management server 34, the database 35, the cache server 36, and the cloud provider server 40, an agent for outputting the information to the monitoring system 50 may be installed. The agent can output information for debugging related to the installed constituent element, and information regarding more detailed operating state of the installed constituent element to the monitoring system 50.

The information acquiring unit 56 includes an information acquisition processing unit 56*b* which acquires information by the information acquiring adapter. In the information acquiring unit 56, the function of information acquisition is constructed by the information acquiring adapter. Therefore, in conformity with functionality expansion of the remote management system 30, the function of information acquisition can be flexibly extended. Thus, the monitoring system 50 can minimize a change caused by the functionality expansion of the remote management system 30.

The information analyzing unit 57 includes a logic generating unit 57*a*, which generates a logic for allocating information acquired by the information acquiring unit 56 by a known learning algorithm such as machine learning, neuro-computing, and deep learning, and an information allocating unit 57*b*, which allocates the information acquired by the information acquiring unit 56 by means of the logic generated by the logic generating unit 57*a*. Examples of the logic for allocating information, which is generated by the logic generating unit 57*a*, are a logic for allocating information according to time series, a logic for allocating information according to a significance level of the failure, a logic for allocating information according to a degree of similarity to failures that have occurred in the past, and a logic for allocating information according to whether a failure occurs simultaneously in the other constituent element. Note that the significance level of the failure may be determined according to a specific rule on the basis of, for example, at least one of the occurrence place of the failure and the frequency of occurrence of the failure.

The information analyzing unit 57 includes a failure detecting unit 57*c* which detects a failure of the remote management system 30 on the basis of the information allocated by the information allocating unit 57*b*. For example, the information analyzing unit 57 can detect whether a communication between the image forming device and the remote management system 30 is established, on the basis of the information acquired from the image forming device of the system 10, and the information acquired from the constituent element of the remote management system 30. Also, the information analyzing unit 57 can detect whether a remote operation of the image forming device is correctly performed by the remote management system 30, on the basis of the information acquired from the image forming device of the system 10, and the information acquired from the constituent element of the remote management system 30. The information analyzing unit 57 can also detect whether the cloud platform on which the remote management system 30 operates is operating normally, on the basis of the information acquired from the cloud provider server 40.

The information analyzing unit 57 includes a process determining unit 57*d* which determines a process that is associated in the process table 54*b* with a failure detected by the failure detecting unit 57*c*. Examples of the process determined by the process determining unit 57*d* are a reboot of the remote management system 30, a scale out of the cloud platform on which the remote management system 30 operates, maintenance of data in the database 35, increasing the capacity of the database 35, and disconnection of a server having a trouble in the remote management system 30.

The result notifying unit 58 includes a message transmission adapter 58*a*, which is a module for transmitting, when a failure analyzed by the information analyzing unit 57 satisfies a condition set in the notification destination determination table 54*f*, a message indicating the failure to a notification destination set in the notification destination determination table 54*f* according to the failure. For example, the result notifying unit 58 may transmit a message indicating occurrence of a failure whose significance level is lower than a specific significance level to only the engineers who can execute an appropriate action for the remote management system 30, or may transmit a message indicating occurrence of a failure whose significance level is higher than a specific significance level to not only the engineers who can execute an appropriate action for the remote management system 30, but also a wider range of people concerned such as a sales company that manages the image forming device.

The result notifying unit 58 includes a command transmission adapter 58*b*, which is a module for transmitting a command for process that has been determined by the process determining unit 57*d* to one of the elements appropriate for this command from the remote management system 30 and the cloud provider server 40.

The result notifying unit 58 includes a notification processing unit 58*c* which controls the message transmission adapter 58*a* and the command transmission adapter 58*b*. In the result notifying unit 58, the function of notification is constructed by modules such as the message transmission adapter 58*a* and the command transmission adapter 58*b*. Therefore, in conformity with functionality expansion of the remote management system 30, the function of notification can be flexibly extended. Thus, the monitoring system 50 can minimize a change caused by the functionality expansion of the remote management system 30.

Next, the operation of the monitoring system 50 when occurrence of a failure is to be notified will be described.

Figure 4:
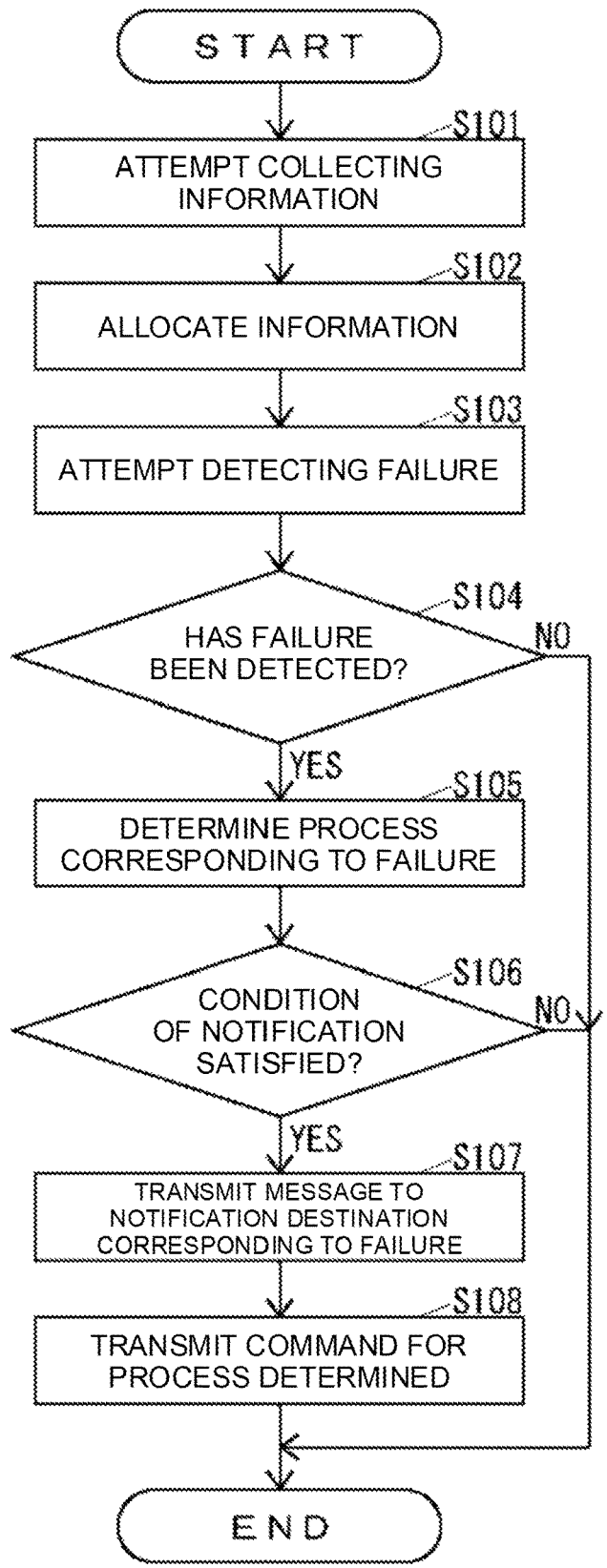
FIG. 4 is a flowchart of the operation of the monitoring system shown in FIG. 3 when occurrence of a failure is to be notified.

FIG. 4 is a flowchart of the operation of the monitoring system 50 when occurrence of a failure is to be notified.

The control unit 55 of the monitoring system 50 executes the operation indicated in FIG. 4 at a specific timing such as at regular timing of every one second, for example.

As shown in FIG. 4, the information acquisition processing unit 56*b* attempts collecting information from the constituent element of the system 10 (S101).

Next, the information allocating unit 57*b* allocates the information acquired in S101 by means of the logic generated by the logic generating unit 57*a* (S102).

Next, the failure detecting unit 57*c* attempts detecting a failure of the remote management system 30 on the basis of the information allocated in S102 (S103). For example, in a case where the load of a command server is increased by a specific degree or more, when the number of image forming devices connected to the command server is decreased by a specific degree or more, the failure detecting unit 57*c* may detect a failure as a failure of the command server. Also, in a case where the load of the database 35 is increased by a specific degree or more, when failure in acquisition of data from the database 35 occurs by a specific degree or more, the failure detecting unit 57c may detect a failure as a failure of the database 35. The failure detecting unit 57c can also detect occurrence of a failure of the remote management system 30 before the failure occurs by predicting the occurrence by a known learning algorithm such as machine learning, neuro-computing, and deep learning, on the basis of the information allocated in S102.

After the processing of S103, the failure detecting unit 57c determines whether a failure of the remote management system 30 has been detected in S103 (S104).

If the failure detecting unit 57c determines, in S104, that no failure of the remote management system 30 has been detected, the operation shown in FIG. 4 is ended.

If it is determined in S104 that a failure of the remote management system 30 has been detected, the process determining unit 57d determines a process which is associated in the process table 54b with the failure detected in S103 (S105).

Next, the notification processing unit 58c determines whether the failure detected in S103 satisfies the condition set in the notification destination determination table 54f (S106).

If the notification processing unit 58c determines, in S106, that the failure detected in S103 does not satisfy the condition set in the notification destination determination table 54f, the operation shown in FIG. 4 is ended.

If it is determined in S106 that the failure detected in S103 satisfies the condition set in the notification destination determination table 54f, the message transmission adapter 58a transmits a message indicating the failure to a notification destination set in the notification destination determination table 54f according to the failure (S107).

Next, the command transmission adapter 58b transmits a command for process that has been determined in S105 to one of the elements appropriate for this command from the remote management system 30 and the cloud provider server 40 (S108), and the operation shown in FIG. 4 is ended.

Although the monitoring system 50 transmits, in S108, the command for process determined in S105 as described above, the monitoring system 50 may transmit, in S107, a message including the details of the process determined in S105 without executing the processing of S108.

As described above, when a failure occurs in the remote management system 30 (YES in S104), since the monitoring system 50 notifies about the failure of the remote management system 30 (S107), an appropriate action can be taken for the remote management system 30. Accordingly, the monitoring system 50 can improve the stability of remote management of the image forming device by means of the remote management system 30.

The monitoring system 50 detects a failure of the remote management system 30 on the basis of not only the information acquired from the remote management system 30, but also the information acquired from at least one of the image forming device and the cloud platform on which the remote management system 30 operates (S101 to S103). Consequently, accuracy of detecting the failure of the remote management system 30 can be improved.

The monitoring system 50 analyzes the information by allocating the information according to at least one of criteria including: the time series; the significance level of the failure indicated by the information; the degree of similarity of the failure indicated by the information as compared to failures that have occurred in the past; and whether a failure occurs simultaneously in a constituent element different from a constituent element from which the information has been acquired (S102 to S103). Consequently, it is possible to detect a failure of the remote management system 30, which is difficult to be noticed by human monitoring, on the basis of an enormous amount of information acquired from the remote management system 30 and the like.

When the detected failure satisfies a preset condition (YES in S106), the monitoring system 50 notifies about the aforementioned failure to the notification destination set correspondingly to the condition (S107). Consequently, the failure can be notified to an appropriate person corresponding to the failure.

In the present embodiment, the monitoring system 50 is implemented by a computer different from that of the remote management system 30. However, at least a part of the computer which implements the remote management system 30 and at least a part the computer which implements the monitoring system 50 may be the same.

Next, a first modification of the above-described embodiment will be described with reference to FIGS. 5 to 11.

Figure 5:
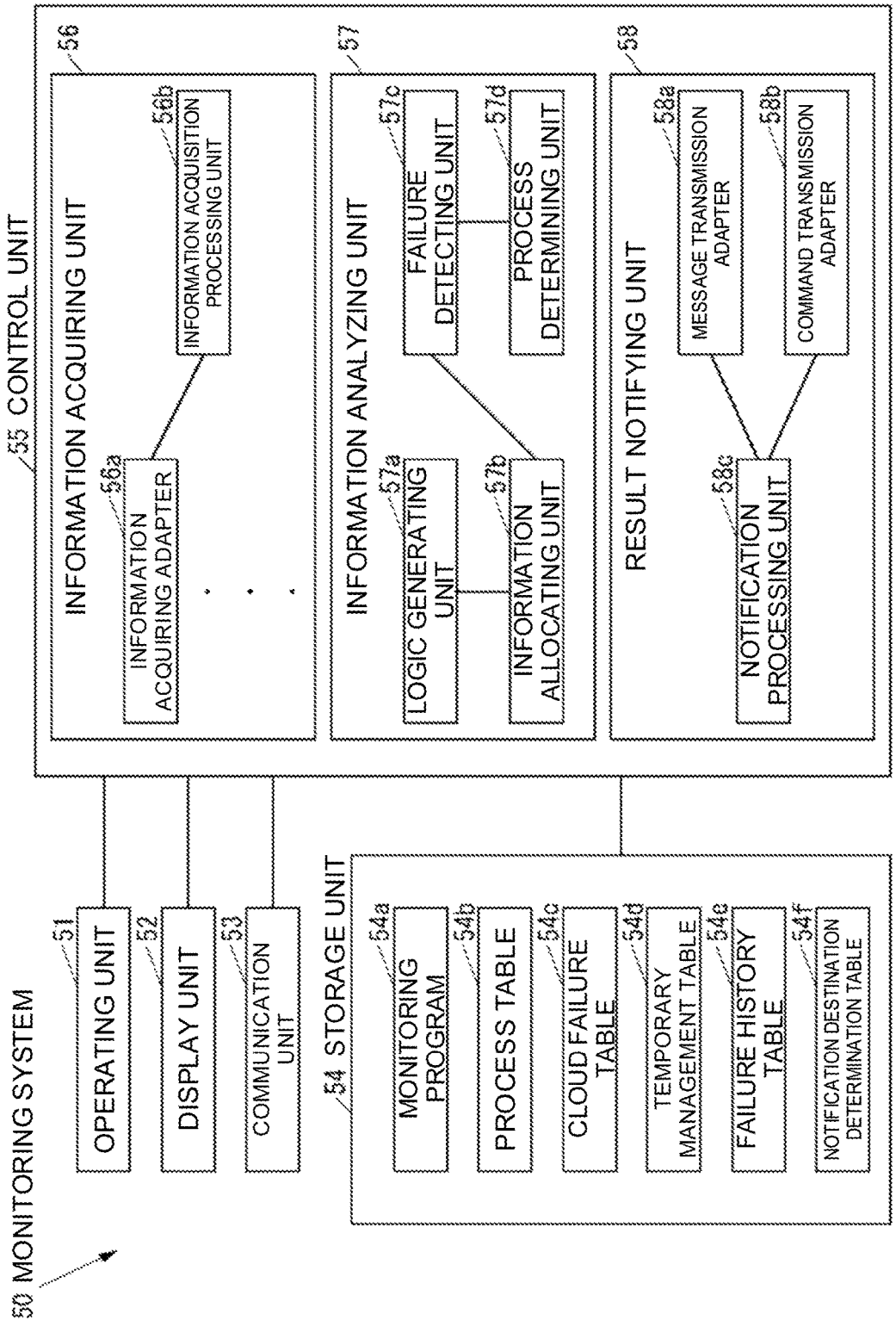
FIG. 5 is a block diagram of a first modification of the monitoring system shown in FIG. 1 in a case where it is configured by a single computer.

As illustrated in FIG. 5, the monitoring system 50 of the present modification realizes a monitoring system that achieves the same technical effect as that of the above-described embodiment by configuring the storage unit 54 such that it can store additional tables other than the tables stored in the above-described embodiment, and performing analysis by the information analyzing unit 57 and notification by the result notifying unit 58 with respect to the information collected by the information acquiring unit 56 with the use of the stored tables. In the description of the present modification, the same reference numbers are assigned to constituent elements that are the same as those of the above-described embodiment, and explanation of such elements is omitted.

As shown in FIG. 5, the storage unit 54 can store a cloud failure table 54c which indicates failures that have occurred in the cloud platform on which the remote management system 30 operates.

FIG. 6 is a drawing showing an example of the cloud failure table 54c.

The cloud failure table 54c shown in FIG. 6 is generated on the basis of information on a failure collected from the cloud platform on which the remote management system 30 operates. The cloud failure table 54c shown in FIG. 6 indicates, for each failure, the original text of the details of the failure collected from the cloud platform on which the remote management system 30 operates, the place having the failure, a region of occurrence of the failure, a failure code indicating the failure, a start date and time of the failure, and an end date and time of the failure.

As shown in FIG. 5, the storage unit 54 can store a temporary management table 54d for temporarily managing failures that have occurred in the remote management system 30.

FIG. 7 is a drawing showing an example of the temporary management table 54d.

The temporary management table 54d shown in FIG. 7 indicates, for each failure, the original text of the details of the failure collected from the remote management system 30, the place having the failure, a region of occurrence of the failure, the significance level of the failure, the place of the cause of the failure indicating whether the cause of the failure is produced internally or externally with respect to the remote management system 30, a detection date and time of the failure, and the degree of similarity to the other failures that have occurred in the past. Note that in the temporary management table 54d shown in FIG. 7, the significance level, the place of the cause, and the degree of similarity of the failure whose detection date and time is "2018/09/22 15:00" are omitted in the illustration.

As shown in FIG. 5, the storage unit 54 can store a failure history table 54e for indicating histories of the failures that have occurred in the remote management system 30.

FIG. 8 is a drawing showing an example of the failure history table 54e.

The failure history table 54e shown in FIG. 8 indicates, for each failure, the original text of the details of the failure collected from the remote management system 30, the place having the failure, a region of occurrence of the failure, the significance level of the failure, the place of the cause of the failure, a detection date and time of the failure, and the degree of similarity to the other failures that have occurred in the past.

As shown in FIG. 5, the storage unit 54 can store a notification destination determination table 54f for determining a destination of notifying about occurrence of a failure.

FIG. 9 is a drawing showing an example of the notification destination determination table 54f.

The notification destination determination table 54f shown in FIG. 9 indicates, for each condition for notifying about occurrence of a failure that is formed of a combination of the place having the failure, a region of occurrence of the failure, the significance level of the failure, the place of the cause of the failure, and the degree of similarity to the other failures that have occurred in the past, a destination of notifying about the occurrence of the failure, and contents of notification of the occurrence of the failure. Here, in the notification destination determination table 54f, for the significance level of the failure, a range such as 50 or more but less than 60 may be set. In the notification destination determination table 54f, a range may be similarly set for the degree of similarity as for the significance level. Also, in the notification destination determination table 54f, for the place of the cause of the failure, the setting may be made to distinguish between the causes that are internal and external with respect to the remote management system 30, or the setting may be made such that either cause that is internal or external with respect to the remote management system 30 applies. In the notification destination determination table 54f shown in FIG. 9, for the "Place of Cause" of the notification condition in which the place, the region of occurrence, the significance level, and the degree of similarity correspond to "ServiceA", "US", "50 or more but less than 60", and "60", respectively, the setting is made such that either cause that is internal or external with respect to the remote management system 30 applies.

The control unit 55 shown in FIG. 5 can update the notification destination determination table 54f in response to an instruction given via the operating unit 51 or the communication unit 53.

Note that the result notifying unit 58 of the present modification includes the message transmission adapter 58a, which is a module for transmitting, when a failure analyzed by the information analyzing unit 57 satisfies a condition set in the notification destination determination table 54f, a message indicating the failure to a notification destination set in the notification destination determination table 54f according to the failure. For example, the result notifying unit 58 may transmit a message indicating occurrence of a failure whose significance level is lower than a specific significance level to only the engineers who can execute an appropriate action for the remote management system 30, or may transmit a message indicating occurrence of a failure whose significance level is higher than a specific significance level to not only the engineers who can execute an appropriate action for the remote management system 30, but also a wider range of people concerned such as a sales company that manages the image forming device.

Next, the operation of the monitoring system 50 when the cloud failure table 54c is to be updated will be described.

Figure 10:
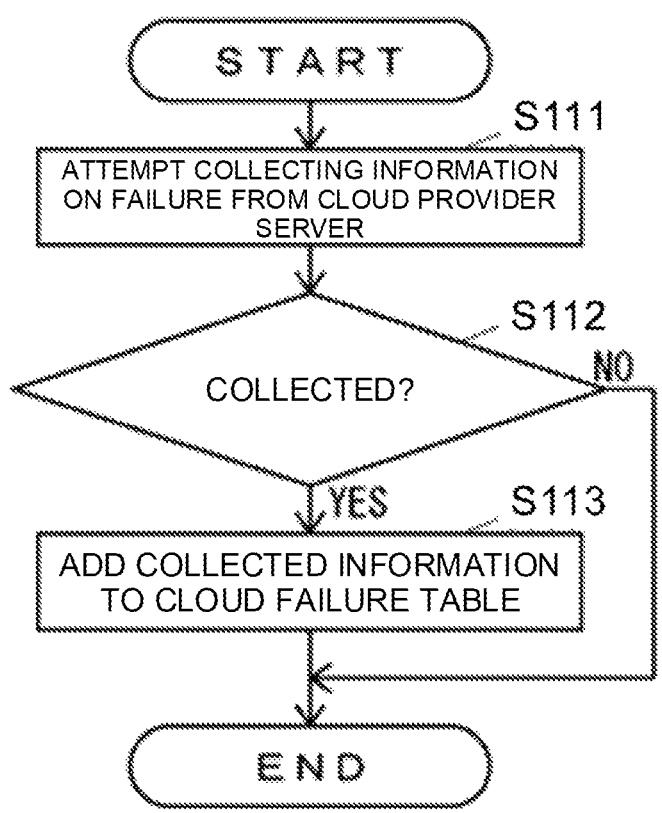
FIG. 10 is a flowchart of the operation of the monitoring system shown in FIG. 5 when the cloud failure table is to be updated.

FIG. 10 is a flowchart of the operation of the monitoring system 50 when the cloud failure table 54c is to be updated.

Also in the present modification, the control unit 55 of the monitoring system 50 executes the operation indicated in FIG. 10 at a specific timing such as at regular timing of every one second, for example.

As shown in FIG. 10, the information acquiring unit 56 attempts collecting information on a failure which has occurred in the cloud platform on which the remote management system 30 operates from the cloud provider server 40 (S111).

Next, the failure detecting unit 57c determines whether the information on the failure has been collected in S111 (S112).

If the failure detecting unit 57c determines, in S112, that the information on the failure has been collected, the failure detecting unit 57c adds the information on the failure, which has been collected in S111, to the cloud failure table 54c (S113).

If the failure detecting unit 57c determines, in S112, that no information on the failure has been collected, or the processing of S113 is completed, the operation shown in FIG. 10 is ended.

Next, the operation of the monitoring system 50 when occurrence of a failure is to be notified in the present modification will be described.

Figure 11:
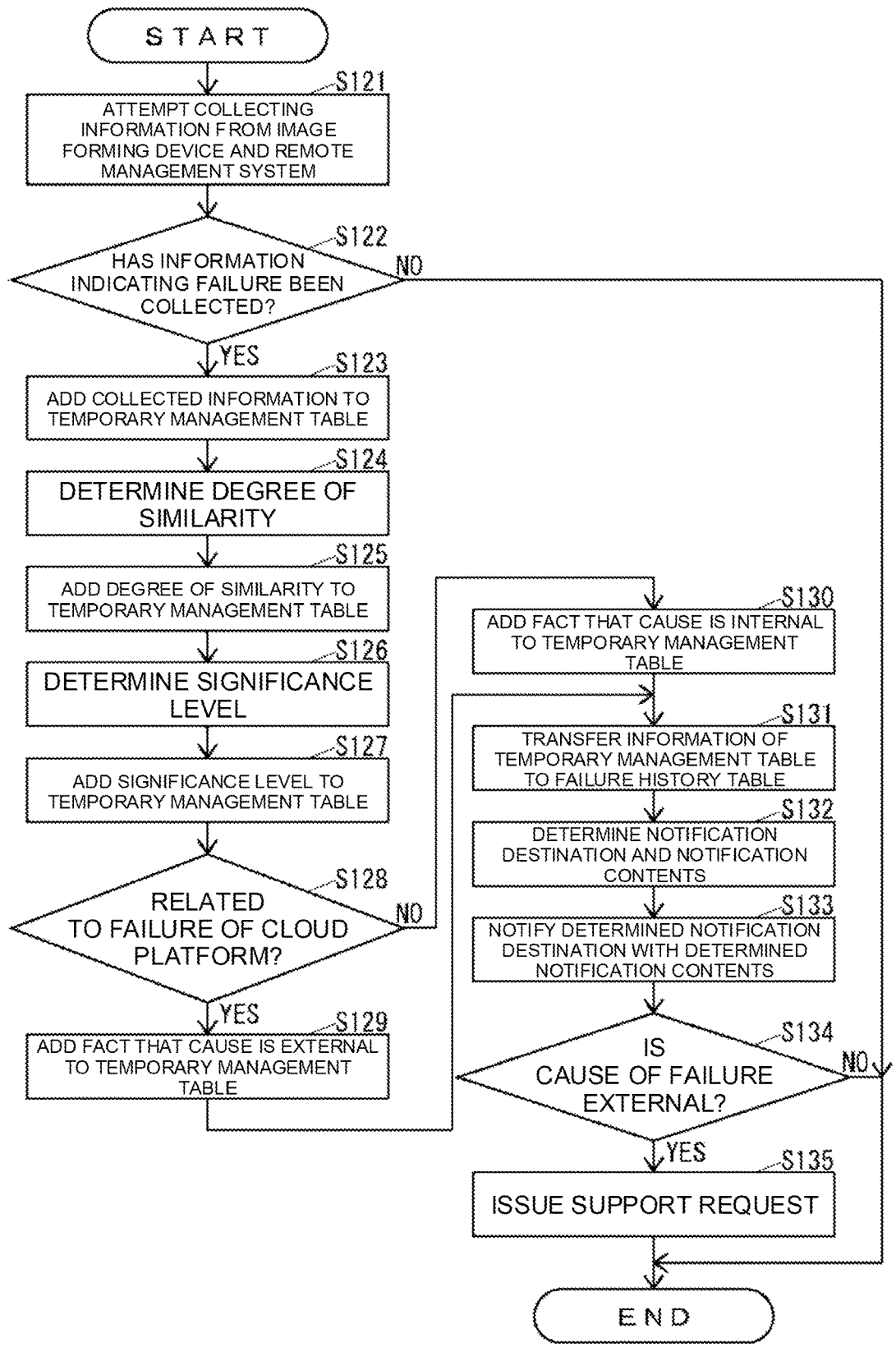
FIG. 11 is a flowchart of the operation of the monitoring system shown in FIG. 5 when occurrence of a failure is to be notified.
Figure 12:
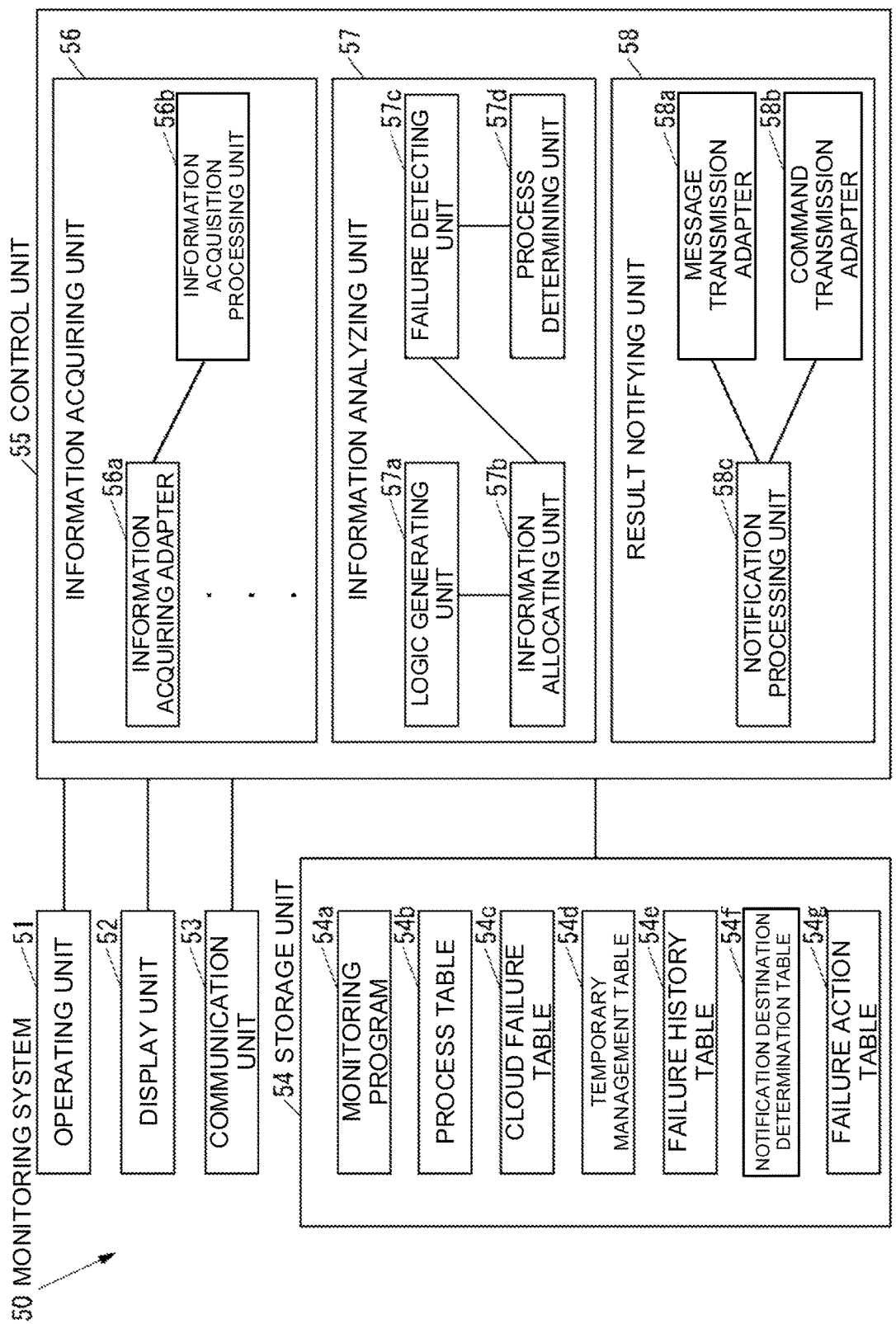
FIG. 12 is a block diagram of a second modification of the monitoring system shown in FIG. 1 in a case where it is configured by a single computer.

FIG. 11 is a flowchart of the operation of the monitoring system 50 when occurrence of a failure is to be notified.

The control unit 55 of the monitoring system 50 executes the operation indicated in FIG. 11 at a specific timing such as at regular timing of every one second, for example.

As shown in FIG. 11, the information acquisition processing unit 56b attempts collecting information from the image forming device of the system 10, and the constituent elements of the remote management system 30 (S121).

Next, the failure detecting unit 57c determines whether the information indicating a failure of the remote management system 30 has been collected in S121 (S122).

If the failure detecting unit 57c determines, in S122, that no information indicating a failure of the remote management system 30 has been collected, the operation shown in FIG. 11 is ended.

If the failure detecting unit 57c determines, in S122, that the information indicating the failure of the remote management system 30 has been collected, the failure detecting unit 57c adds the information on the failure that is determined as having been collected in S122 to the temporary management table 54d (S123). Here, with respect to the failure added to the temporary management table 54d in S123, the significance level, the place of the cause, and the degree of similarity are not yet stored immediately after completion of the processing of S123, as in the failure whose detection date and time is "2018/09/22 15:00" indicated in FIG. 7.

After the processing of S123, the failure detecting unit 57c determines, on the basis of the information on the failure that has been added to the temporary management table 54d in S123, and information on the past failures indicated in the failure history table 54e, the degree of similarity of the failure that has been added to the temporary management table 54d in S123, as compared to the other failures that have occurred in the past, according to a specific determination method (S124). The determination method in S124 may be, for example, a method using known statistical processing, or a known learning algorithm such as machine learning, neuro-computing, and deep learning.

After the processing of S124, the failure detecting unit 57c adds the degree of similarity, which has been determined in S124, to the information on the failure that has been added to the temporary management table 54d in S123 (S125).

Next, the failure detecting unit 57c determines the significance level of the failure that has been added to the temporary management table 54d in S123 according to a specific determination method (S126). The determination method in S126 may be a method of making the determination according to a specific rule on the basis of, for example, at least one of the occurrence place of the failure and the frequency of occurrence of the failure.

After the processing of S126, the failure detecting unit 57c adds the significance level, which has been determined in S126, to the information on the failure that has been added to the temporary management table 54d in S123 (S127).

Next, the failure detecting unit 57c determines, on the basis of the information on the failure added to the temporary management table 54d in S123, and the information on the failure indicated in the cloud failure table 54c, whether the failure corresponding to the failure added to the temporary management table 54d in S123 is related to the failure indicated in the cloud failure table 54c, in other words, the failure of the cloud platform on which the remote management system 30 operates (S128). That is, if the place having the failure, the region of occurrence, and the detection date and time which have been added to the temporary management table 54d in S123 are included in the information of any of the failures indicated in the cloud failure table 54c, the failure detecting unit 57c determines, in S128, that the failure added to the temporary management table 54d in S123 is related to the failure indicated in the cloud failure table 54c. For example, the failure detecting unit 57c determines that a failure whose place, region of occurrence, and detection date and time correspond to "ServiceA", "US", and "2018/09/22 15:00", respectively, as shown in FIG. 7, is related to a failure whose original text of the details, region of occurrence, start date and time, and end date and time correspond to "Failure has occurred in Service A.", "US", "2018/09/22 14:00" and "2018/09/22 16:00", respectively, as shown in FIG. 6.

Since it may take time for the failure of the cloud platform on which the remote management system 30 operates to be reflected in the cloud failure table 54c, the failure detecting unit 57c may execute the processing of S128 after a specific time has elapsed from the processing of S127.

If the failure detecting unit 57c determines, in S128, that the failure corresponding to the failure added to the temporary management table 54d in S123 is related to the failure of the cloud platform on which the remote management system 30 operates, the failure detecting unit 57c stores the fact that the cause of the failure is produced externally with respect to the remote management system 30 as the place of the cause of the failure that has been added to the temporary management table 54d in S123 (S129).

If the failure detecting unit 57c determines, in S128, that the failure corresponding to the failure added to the temporary management table 54d in S123 is not related to the failure of the cloud platform on which the remote management system 30 operates, the failure detecting unit 57c stores the fact that the cause of the failure is produced internally with respect to the remote management system 30 as the place of the cause of the failure that has been added to the temporary management table 54d in S123 (S130).

After the processing of S129 or S130, the failure detecting unit 57c transfers the failure that has been added to the temporary management table 54d in S123 to the failure history table 54e (S131). That is, the failure detecting unit 57c reflects all items of information at present regarding the failure that has been added to the temporary management table 54d in S123 in the failure history table 54e, and also deletes the all items of information at present regarding the failure that has been added to the temporary management table 54d in S123 from the temporary management table 54d.

After the processing of S131, the notification processing unit 58c determines, on the basis of information on the failure that has been transferred to the failure history table 54e in S131, and the notification destination determination table 54f, a destination of notifying about the occurrence of the failure, and contents of notification of the occurrence of the failure, which are set in the notification destination determination table 54f, with respect to the failure that has been transferred to the failure history table 54e in S131 (S132). That is, the notification processing unit 58c specifies a combination corresponding to the place having the failure, a region of occurrence of the failure, the significance level of the failure, the place of the cause of the failure, and the degree of similarity to the other failures that have occurred in the past, which have been transferred to the failure history table 54e in S131, from among the combinations of the place having the failure, a region of occurrence of the failure, the significance level of the failure, the place of the cause of the failure, and the degree of similarity to the other failures that have occurred in the past, which are indicated in the notification destination determination table 54f, and determines a destination of notifying about the occurrence of the failure, and contents of notification of the occurrence of the failure, which are indicated in the notification destination determination table 54f, with respect to the specified combination. For example, the notification processing unit 58c may designate only the engineers who can execute an appropriate action for the remote management system 30 as the notification destination for a failure whose significance level is lower than a specific significance level, or may designate not only the engineers who can execute an appropriate action for the remote management system 30, but also a wider range of people concerned such as a sales company that manages the image forming device as the notification destination for a failure whose significance level is higher than a specific significance level.

After the processing of S132, the notification processing unit 58c notifies the notification destination that has been determined in S132 with the notification contents determined in S132 (S133). Here, the notification processing unit 58c may include, in the notification contents to be notified in S133, various kinds of information in the failure history table 54e regarding the failure that has been transferred to the failure history table 54e in S131.

After the processing of S133, the notification processing unit 58c determines whether the place of the cause of the failure that has been transferred to the failure history table 54e in S131 is external with respect to the remote management system 30, on the basis of the place of the cause of the failure that has been transferred to the failure history table 54e in S131 (S134).

If the notification processing unit 58c determines, in S134, that the place of the cause of the failure that has been transferred to the failure history table 54e in S131 is external with respect to the remote management system 30, the notification processing unit 58c issues a support request for notifying about the details of the failure to a provider of the cloud platform on which the remote management system 30 operates (S135).

If the notification processing unit 58c determines, in S134, that the place of the cause of the failure that has been transferred to the failure history table 54e in S131 is not external with respect to the remote management system 30, or the processing of S135 is completed, the operation shown in FIG. 11 is ended.

As described above, when a failure occurs in the remote management system 30 (YES in S122), since the monitoring system 50 of the present modification notifies about the failure of the remote management system 30 to an appropriate notification destination corresponding to the significance level of the failure in question (S132 to S133), an appropriate action can be taken for the remote management system 30. Accordingly, the monitoring system 50 can improve the stability of remote management of the image forming device by means of the remote management system 30.

Also in the present modification, the monitoring system 50 detects a failure of the remote management system 30 on the basis of not only the information acquired from the remote management system 30, but also the information acquired from the image forming device (S121 to S122). Consequently, accuracy of detecting the failure of the remote management system 30 can be improved.

Also, the monitoring system 50 detects a failure of the remote management system 30 on the basis of not only the information acquired from the remote management system 30, but also the information acquired from the cloud platform on which the remote management system 30 operates (S121 to S122). Consequently, accuracy of detecting the failure of the remote management system 30 can be improved.

Further, when a cause of the failure of the remote management system 30 is produced by a failure of the cloud platform (YES in S134), the monitoring system 50 issues a support request for notifying about the details of the failure to a provider of the cloud platform (S135). Thus, the possibility of being able to take an appropriate action for the cloud platform on which the remote management system 30 operates is increased, and as a result, the stability of remote management of the image forming device by means of the remote management system 30 can be improved.

When the place of the cause of the failure of the remote management system 30 is external with respect to the remote management system 30 (YES in S134), the monitoring system 50 issues a support request for notifying about the details of the failure to a provider of the cloud platform on which the remote management system 30 operates (S135). Consequently, it is possible to prompt the provider of the cloud platform to quickly bring the cloud platform back to recovery from the failure. However, after the processing S133, the monitoring system 50 may end the operation shown in FIG. 11 without executing the processing of S134 and S135.

The condition for notifying about the occurrence of a failure in the notification destination determination table 54f includes, in the present embodiment, the place having the failure, a region of occurrence of the failure, the significance level of the failure, the place of the cause of the failure, and the degree of similarity to the other failures that have occurred in the past. However, the condition for notifying about the occurrence of a failure may not include at least one of the place having the failure, a region of occurrence of the failure, the significance level of the failure, the place of the cause of the failure, and the degree of similarity to the other failures that have occurred in the past.

Also in the present modification, the monitoring system 50 is implemented by a computer different from that of the remote management system 30. However, at least a part of the computer which implements the remote management system 30 and at least a part the computer which implements the monitoring system 50 may be the same.

Next, a second modification of the above-described embodiment will be described with reference to FIGS. 12 to 15.

The monitoring system 50 of the present modification is configured such that a failure action table can be further stored in the storage unit 54 of the first modification, and the monitoring system 50 performs analysis by the information analyzing unit 57 and notification by the result notifying unit 58 with respect to information collected by the information acquiring unit 56 with the use of the table stored in the storage unit, and also executes a prescribed action for the remote management system automatically in accordance with a result of analysis. Also with the present modification, it is possible to realize a monitoring system that achieves the same technical effect as that of the above-described embodiment. In the description of the present modification, the same reference numbers are assigned to constituent elements that are the same as those of the above-described embodiment and the first modification, and explanation of such elements is omitted.

The storage unit 54 can store a failure action table 54g which indicates an action for a failure for each failure. The control unit 55 can update the failure action table 54g in response to an instruction given via the operating unit 51 or the communication unit 53.

Figure 13:
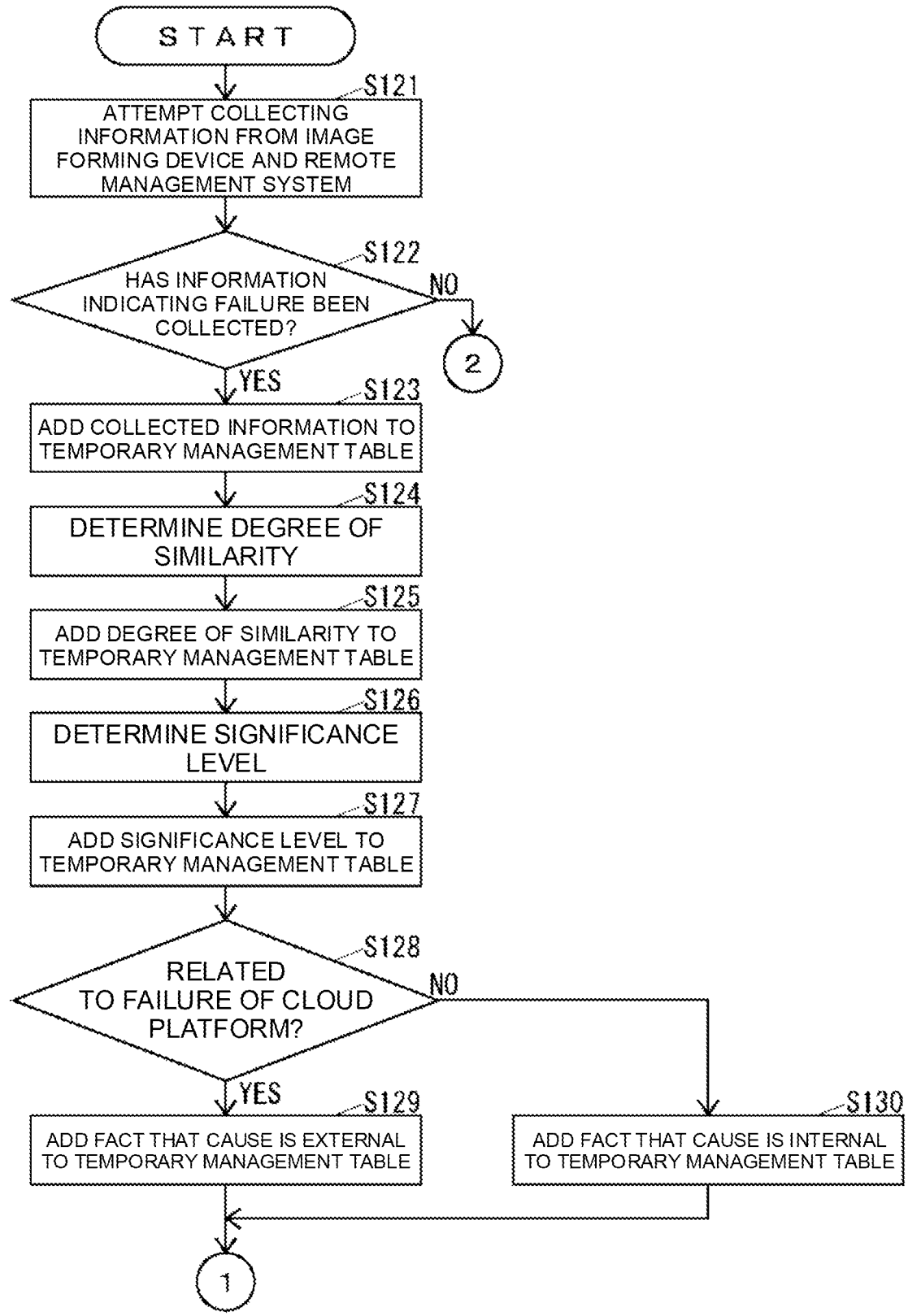
FIG. 13 is a flowchart of the operation of the monitoring system shown in FIG. 12 when occurrence of a failure is to be notified.
Figure 14:
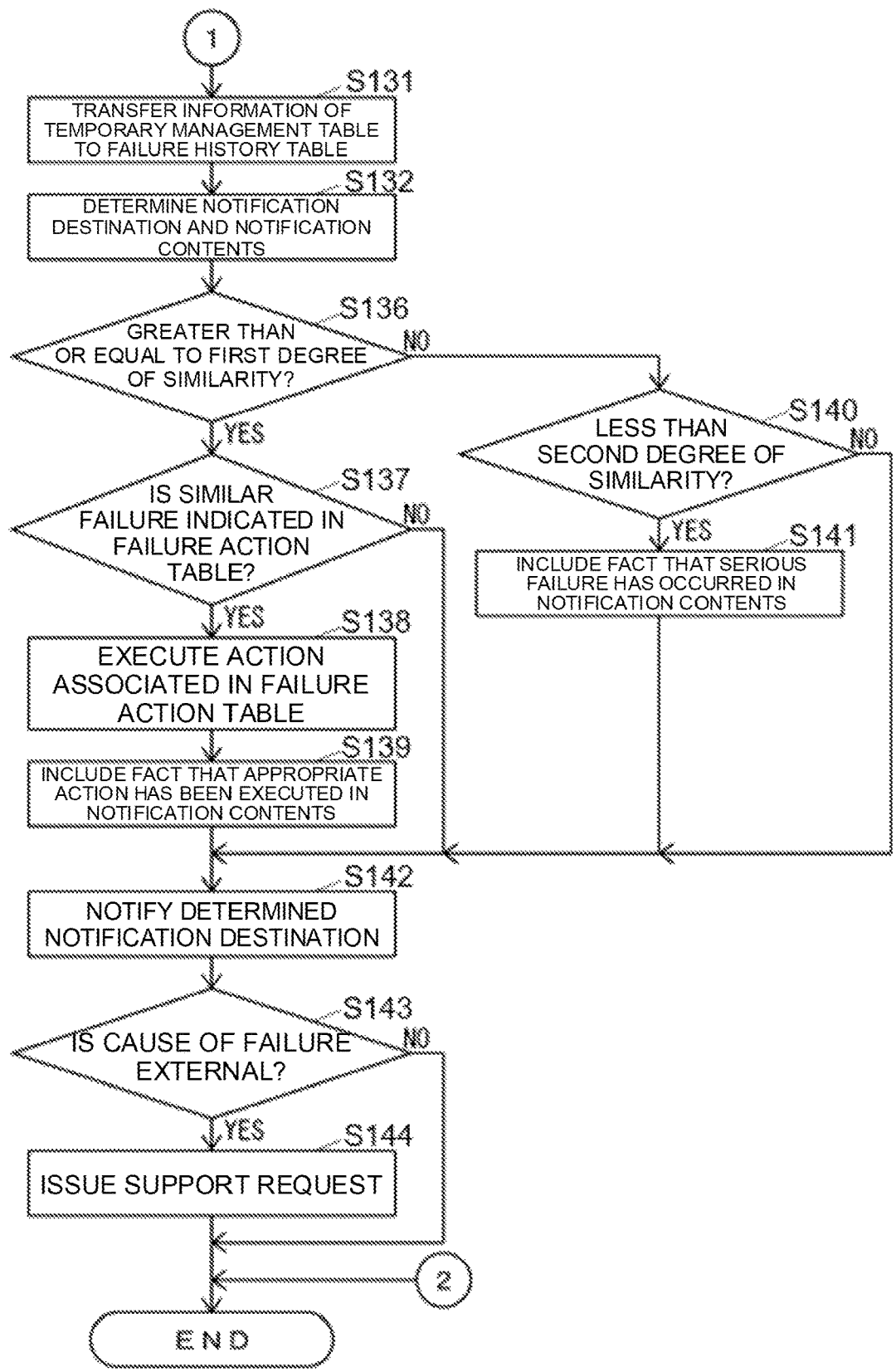
FIG. 14 is a flowchart following the flowchart of FIG. 13.

Each of FIGS. 13 and 14 is a flowchart of the operation of the monitoring system 50 when occurrence of a failure is to be notified in the present modification. Since the operation of the monitoring system 50 when the cloud failure table 54c is to be updated is the same as that of the first modification described above, explanation of the aforementioned operation is omitted in the present modification.

The control unit 55 of the monitoring system 50 executes the operation indicated in FIGS. 13 and 14 at a specific timing such as at regular timing of every one second, for example.

Since steps S121 to S131 are the same as those of the first modification, explanation of the aforementioned steps is omitted.

After the processing of S131, the notification processing unit 58c determines, on the basis of the information on the failure that has been transferred to the failure history table 54e in S131, and the notification destination determination table 54f, a destination of notifying about the occurrence of the failure, which is set in the notification destination determination table 54f, with respect to the failure that has been transferred to the failure history table 54e in S131 (S132). That is, the notification processing unit 58c specifies a combination corresponding to the place having the failure, a region of occurrence of the failure, the significance level of the failure, and the place of the cause of the failure, which have been transferred to the failure history table 54e in S131, from among the combinations of the place having the failure, a region of occurrence of the failure, the significance level of the failure, and the place of the cause of the failure, which are indicated in the notification destination determination table 54f, and determines a destination of notifying about the occurrence of the failure, which is indicated in the notification destination determination table 54f, with respect to the specified combination. For example, the notification processing unit 58c may designate only the engineers who can execute an appropriate action for the remote management system 30 as the notification destination for a failure whose significance level is lower than a specific significance level, or may designate not only the engineers who can execute an appropriate action for the remote management system 30, but also a wider range of people concerned such as a sales company that manages the image forming device as the notification destination for a failure whose significance level is higher than a specific significance level.

After the processing of S132, the notification processing unit 58c determines whether the degree of similarity of the failure that has been transferred to the failure history table 54e in S131 as compared to the other failures that have occurred in the past is greater than or equal to a first degree of similarity (S136).

If the notification processing unit 58c determines, in S136, that the degree of similarity is greater than or equal to the first degree of similarity, the notification processing unit 58c determines whether a failure, the degree of similarity of which to the failure that has been transferred to the failure history table 54e in S131 is determined as being greater than or equal to the first degree of similarity in S136, is indicated in the failure action table 54g (S137).

If the notification processing unit 58c determines, in S137, that the failure, the degree of similarity of which to the failure that has been transferred to the failure history table 54e in S131 is determined as being greater than or equal to the first degree of similarity in S136, is indicated in the failure action table 54g, an action being associated in the failure action table 54g with the failure, the degree of similarity of which to the failure that has been transferred to the failure history table 54e in S131 is determined as being greater than or equal to the first degree of similarity in S136, is automatically executed for the remote management system 30 (S138).

Next, the notification processing unit 58c includes, in the notification contents planned to be notified to the notification destination that has been determined in S132, the fact that an appropriate action has been executed (S139).

If the notification processing unit 58c determines, in S136, that the degree of similarity is not greater than or equal to the first degree of similarity, the notification processing unit 58c determines whether the degree of similarity of the failure that has been transferred to the failure history table 54e in S131 as compared to the other failures that have occurred in the past is less than a second degree of similarity (S140). Here, it suffices that the second degree of similarity is not greater than the first degree of similarity.

If the notification processing unit 58c determines, in S140, that the degree of similarity is less than the second degree of similarity, the notification processing unit 58c includes, in the notification contents planned to be notified to the notification destination that has been determined in S132, the fact that a serious failure never encountered before has occurred (S141).

If the notification processing unit 58c performs one of the following of determining, in S137, that the failure, the degree of similarity of which to the failure that has been transferred to the failure history table 54e in S131 is determined as being greater than or equal to the first degree of similarity in S136, is not indicated in the failure action table 54g; executing the processing of S139; determining, in S140, that the degree of similarity is not less than the second degree of similarity; or executing the processing of S141, the notification processing unit 58c notifies the notification destination that has been determined in S132 with the notification contents indicating that a failure has occurred (S142). Here, the notification processing unit 58c may include, in the notification contents to be notified in S142, various kinds of information in the failure history table 54e regarding the failure that has been transferred to the failure history table 54e in S131. If the notification processing unit 58c has already executed the processing of S139, the notification processing unit 58c includes the fact that an appropriate action has been taken in the notification contents to be notified in S142. Also, if the notification processing unit 58c has already executed the processing of S141, the notification processing unit 58c includes the fact that a serious failure never encountered before has occurred in the notification contents to be notified in S142.

After the processing of S142, the notification processing unit 58c determines whether the place of the cause of the failure that has been transferred to the failure history table 54e in S131 is external with respect to the remote management system 30, on the basis of the place of the cause of the failure that has been transferred to the failure history table 54e in S131 (S143).

If the notification processing unit 58c determines, in S143, that the place of the cause of the failure that has been transferred to the failure history table 54e in S131 is external with respect to the remote management system 30, the notification processing unit 58c issues a support request for notifying about the details of the failure to a provider of the cloud platform on which the remote management system 30 operates (S144).

If the notification processing unit 58c determines, in S143, that the place of the cause of the failure that has been transferred to the failure history table 54e in S131 is not external with respect to the remote management system 30, or the processing of S144 is completed, the operation shown in FIGS. 13 and 14 is ended.

As described above, when a failure occurs in the remote management system 30 (YES in S122), since the monitoring system 50 notifies about the failure of the remote management system 30 with the notification contents corresponding to the degree of similarity of the failure in question to failures that have occurred in the past (S136 to S142), an appropriate action can be taken for the remote management system 30. Accordingly, the monitoring system 50 can improve the stability of remote management of the image forming device by means of the remote management system 30.

When a failure whose degree of similarity to failures that have occurred in the past is high occurs in the remote management system 30 (YES in S136), the monitoring system 50 executes an action associated with the failure occurred in the past that is similar to the failure of the remote management system 30 (S138). Consequently, it is possible to take an appropriate action for the remote management system 30.

When a failure whose degree of similarity to failures that have occurred in the past is low occurs in the remote management system 30 (YES in S140), the monitoring system 50 notifies that a serious failure has occurred (S141 to S142). Consequently, an appropriate action can be promptly taken against a serious failure never encountered before.

Since the monitoring system 50 determines the degree of similarity of a failure of the remote management system 30 as compared to the failures that have occurred in the past by using a specific learning algorithm (S124), convenience can be improved.

The monitoring system 50 detects a failure of the remote management system 30 on the basis of not only the information acquired from the remote management system 30, but also the information acquired from the image forming device and the cloud platform on which the remote management system 30 operates (S121 to S122). Consequently, accuracy of detecting the failure of the remote management system 30 can be improved.

Figure 15:
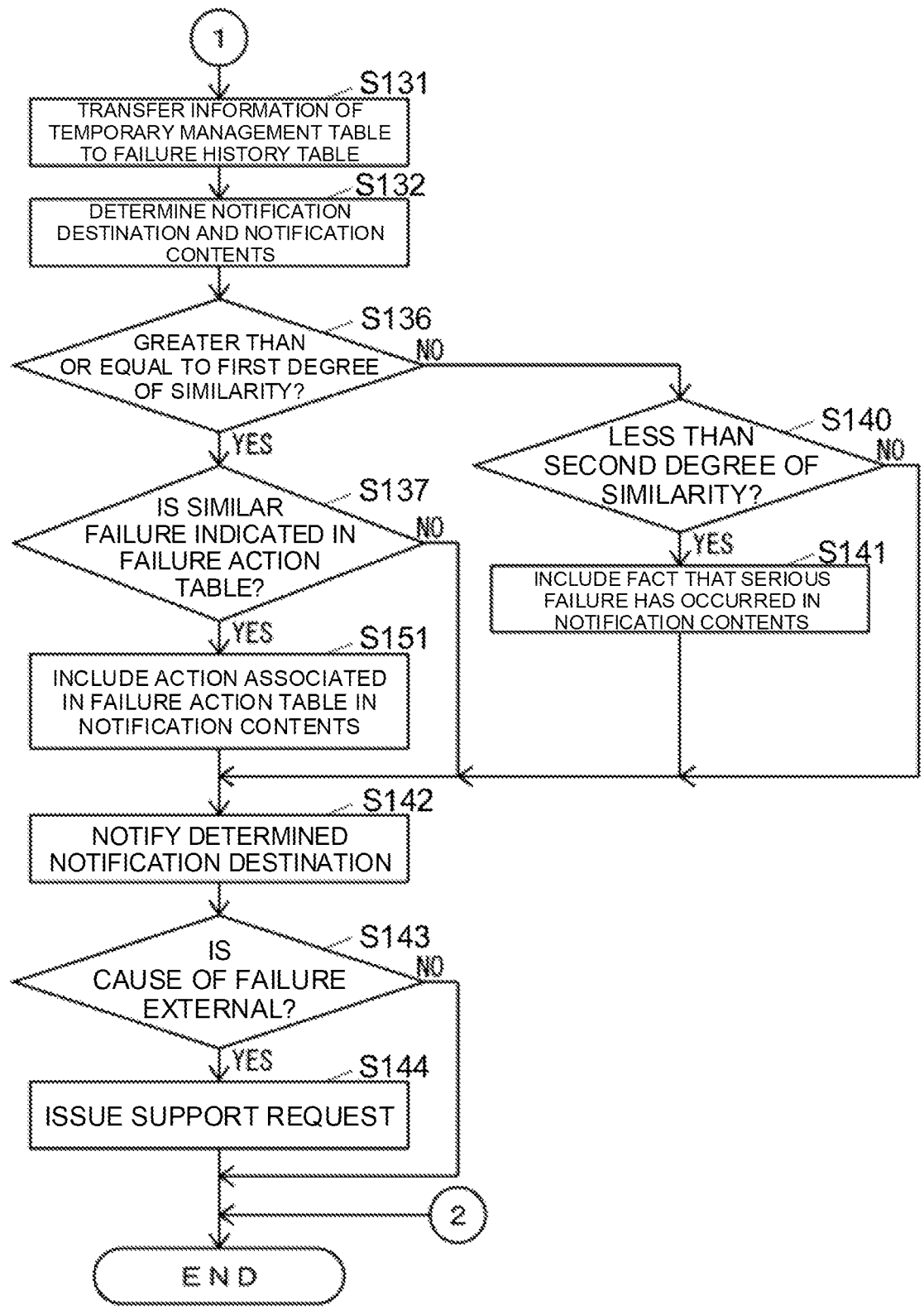
FIG. 15 is a flowchart of a modification of the operation shown in FIGS. 13 and 14.

Note that the monitoring system 50 may execute an operation shown in FIG. 15 instead of the operation shown in FIG. 14. The operation shown in FIG. 15 executes the processing of S151 instead of the processing of S138 and the processing of S139 in the operation shown in FIG. 14. That is, in the operation indicated in FIG. 15, if the notification processing unit 58c determines, in S137, that the failure, the degree of similarity of which to the failure that has been transferred to the failure history table 54e in S131 is determined as being greater than or equal to the first degree of similarity in S136, is indicated in the failure action table 54g, the notification processing unit 58c includes an action being associated in the failure action table 54g with the failure, the degree of similarity of which to the failure that has been transferred to the failure history table 54e in S131 is determined as being greater than or equal to the first degree of similarity in S136, in the notification contents planned to be notified to the notification destination that has been determined in S132 (S151), and executes the processing of S142.

In a case where a failure whose degree of similarity to failures that have occurred in the past is high occurs in the remote management system 30 (YES in S136), when the monitoring system 50 notifies about an action associated with the failure occurred in the past that is similar to the failure of the remote management system 30 (S151 and S142), an appropriate action can be taken for the remote management system 30.

The condition for notifying about the occurrence of a failure in the notification destination determination table 54f includes, in the present embodiment, the place having the failure, a region of occurrence of the failure, the significance level of the failure, and the place of the cause of the failure. However, the condition for notifying about the occurrence of a failure may not include at least one of the place having the failure, a region of occurrence of the failure, the significance level of the failure, and the place of the cause of the failure.

The monitoring system 50 determines, in S132, the notification destination for the notification of S142 in the present embodiment. However, the monitoring system 50 may constantly designate an operations manager of the remote management system 30 as the notification destination for the notification of S142.

Also in the present modification, the monitoring system 50 is implemented by a computer different from that of the remote management system 30. However, at least a part of the computer which implements the remote management system 30 and at least a part the computer which implements the monitoring system 50 may be the same.

DESCRIPTION OF REFERENCE NUMERALS

22 Image forming device
30 Remote management system
31 Command server
32 Device management server
34 User management server
35 Database
36 Cache server
40 Cloud provider server
50 Monitoring system (Computer)
54a Monitoring program
56 Information acquiring unit
57 Information analyzing unit
58 Result notifying unit

The invention claimed is:

1. A monitoring system comprising:
   an information acquiring unit which acquires information from a remote management system, which remotely manages an image forming device;
   an information analyzing unit which analyzes the information acquired by the information acquiring unit; and
   a result notifying unit which notifies about a result of analysis by the information analyzing unit, wherein
   the information analyzing unit detects a failure of the remote management system based on the information acquired by the information acquiring unit, and
   the result notifying unit notifies about the failure of the remote management system detected by the information analyzing unit,
   the information acquiring unit acquires information also from an information and communication technology (ICT) infrastructure on which the remote management system operates, and the information analyzing unit collects information on a failure occurred so far in the ICT infrastructure from the information acquired from the ICT infrastructure,
   the information analyzing unit, when detecting the failure of the remote management system, determines whether a cause of the failure of the remote management system is produced by the failure of the ICT infrastructure, based on the information of the failure of the remote management system and the information of the failure occurred so far in the ICT infrastructure, and
   the result notifying unit issues, when the information analyzing unit determines that the cause of the failure of the remote management system is produced by the failure of the ICT infrastructure, a support request for notifying about details of the failure of the remote management system to a provider of the ICT infrastructure, in addition to the notification about the failure of the remote management system detected by the information analyzing unit.

2. The monitoring system according to claim 1, wherein the information acquiring unit acquires information also from the image forming device.

3. The monitoring system according to claim 1, wherein the information analyzing unit analyzes the information by allocating the information according to at least one of criteria including:
   time series;
   a significance level of the failure indicated by the information;
   a degree of similarity of the failure indicated by the information as compared to failures that have occurred in the past; and
   whether a failure occurs simultaneously in a constituent element different from a constituent element from which the information has been acquired.

4. The monitoring system according to claim 1, wherein the information analyzing unit determines a process associated with the failure which has been detected.

5. The monitoring system according to claim 1, wherein when a failure of the remote management system analyzed by the information analyzing unit satisfies a preset condition, the result notifying unit notifies about the failure to a notification destination set correspondingly to the condition.

6. The monitoring system according to claim 5, wherein the result notifying unit sends a message indicating the failure and a command of the process.

7. The monitoring system according to claim 6, wherein:
the information analyzing unit determines a significance level of the failure which has been detected; and
the result notifying unit notifies about the failure detected by the information analyzing unit to a notification destination set correspondingly to the significance level.

8. The monitoring system according to claim 3, wherein:
the information analyzing unit determines a degree of similarity of the failure of the remote management system which has been detected as compared to failures of the remote management system that have occurred in the past; and
the result notifying unit notifies about the failure of the remote management system which has been detected with notification contents corresponding to the degree of similarity determined by the information analyzing unit.

9. The monitoring system according to claim 8, wherein the result notifying unit executes, when the degree of similarity which has been determined is greater than or equal to a first degree of similarity, an action associated with a failure occurred in the past whose degree of similarity to the failure of the remote management system which has been detected is greater than or equal to the first degree of similarity, for the remote management system.

10. The monitoring system according to claim 9, wherein, when the action is executed for the remote management system, the result notifying unit includes the action which has been executed, in the notification contents.

11. The monitoring system according to claim 8, wherein the result notifying unit includes, when the degree of similarity determined by the information analyzing unit is less than a second degree of similarity, a fact that a serious failure has occurred, in the notification contents.

12. The monitoring system according to claim 8, wherein the information analyzing unit determines the degree of similarity by using a specific learning algorithm.

13. A monitoring method which employs a computer and a storage unit, the monitoring method comprising:
information acquiring of acquiring information from a remote management system, which remotely manages an image forming device;
information analyzing of analyzing the information acquired in the information acquiring; and
result notifying of notifying about a result of analysis of the information analyzing, wherein
the information analyzing includes detecting a failure of the remote management system based on the information acquired in the information acquiring, and the result notifying includes notifying about the failure of the remote management system detected in the information analyzing,
the information acquiring includes acquiring information also from an information and communication technology (ICT) infrastructure on which the remote management system operates, and the information analyzing includes collecting information on a failure occurred so far in the ICT infrastructure from the information acquired from the ICT infrastructure,
the information analyzing includes determining, when detecting the failure of the remote management system, whether a cause of the failure of the remote management system is produced by the failure of the ICT infrastructure, based on the information of the failure of the remote management system and the information of the failure occurred so far in the ICT infrastructure, and
the result notifying includes issuing, when the information analyzing unit determines that the cause of the failure of the remote management system is produced by the failure of the ICT infrastructure, a support request for notifying about details of the failure of the remote management system to a provider of the ICT infrastructure, in addition to the notifying about the failure of the remote management system detected in the information analyzing.

14. A monitoring system comprising:
an information acquiring unit which acquires information from a remote management system, which remotely manages an image forming device;
an information analyzing unit which analyzes the information acquired by the information acquiring unit; and
a result notifying unit which notifies about a result of analysis by the information analyzing unit, wherein
the information analyzing unit detects a failure of the remote management system based on the information acquired by the information acquiring unit,
the result notifying unit notifies about the failure of the remote management system detected by the information analyzing unit, and
the information analyzing unit analyzes the information by allocating the information according to criteria of whether a failure occurs simultaneously in a constituent element different from a constituent element from which the information has been acquired.

15. The monitoring system according to claim 14, wherein the criteria further including at least one of:
time series;
a significance level of the failure indicated by the information; and
a degree of similarity of the failure indicated by the information as compared to failures that have occurred in the past.

* * * * *